United States Patent

[11] 3,627,950

[72] Inventor William C. Sand
St. Charles, Ill.
[21] Appl. No. 864,413
[22] Filed Oct. 7, 1969
[45] Patented Dec. 14, 1971
[73] Assignee Bell Telephone Laboratories, Incorporated
Murray Hill, Berkeley Heights, N.J.

[54] DIAL-TONE-FIRST COIN TELEPHONE CIRCUIT IN WHICH STATION GROUND IS ISOLATED FROM THE CIRCUIT EXCEPT DURING SIGNALING FROM THE CENTRAL OFFICE
7 Claims, 1 Drawing Fig.

[52] U.S. Cl. 179/6.3
[51] Int. Cl. H04m 17/02
[50] Field of Search 179/6.3, 18 GC, 16

[56] References Cited

UNITED STATES PATENTS

| | | | |
|---|---|---|---|
| 2,547,043 | 4/1951 | Pouliart | 179/18 GC |
| 2,791,634 | 5/1957 | Lomax | 179/6.3 |
| 3,146,312 | 8/1964 | Andregg et al. | 179/6.3 |
| 3,428,751 | 2/1969 | Edington | 179/6.3 |

*Primary Examiner*—Kathleen H. Claffy
*Assistant Examiner*—Jan S. Black
*Attorneys*—R. J. Guenther and Kenneth B. Hamlin

ABSTRACT: A dial-tone-first coin telephone circuit is disclosed in which a battery reversal from the central office switches the circuit between two modes of coin signaling. A relay coil is connected between the ring terminal and ground, to disconnect an initial deposit circuit from the station loop except in response to a predetermined signal sent on the ring conductor.

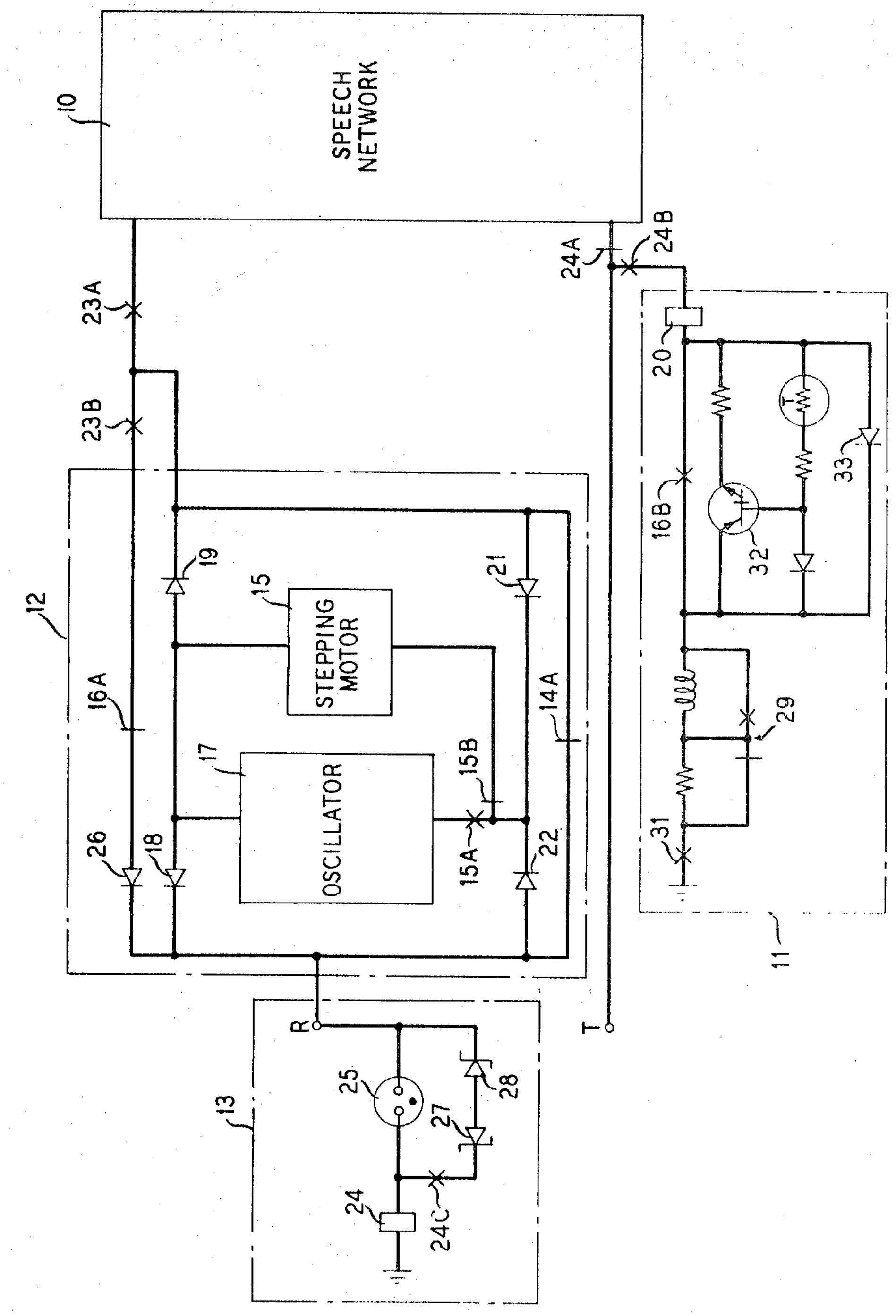
INVENTOR
W. C. SAND
BY [signature]
ATTORNEY

DIAL-TONE-FIRST COIN TELEPHONE CIRCUIT IN WHICH STATION GROUND IS ISOLATED FROM THE CIRCUIT EXCEPT DURING SIGNALING FROM THE CENTRAL OFFICE

FIELD OF THE INVENTION

This invention relates to a coin telephone circuit and particularly to a dial-tone-first coin telephone circuit in which the station ground return circuit is isolated from the loop except during signaling from the central office.

BACKGROUND OF THE INVENTION

In most coin telephones employed today, the deposit of a coin or coins equal to an initial rate is required before dial tone is provided to the coin telephone. It has been found that there are circumstances when it would be desirable to enable limited operation of a coin telephone without the deposit of coins. For example, one might wish to allow a user of a coin telephone to contact an operator, the police, or the fire department coin free.

In order to provide this service, it is necessary to provide dial tone to the coin telephone in response to an off-hook condition. Equipment in the central office would then determine if the call dialed is toll free or a toll call.

One circuit which provides these features is disclosed in U.S. Pat. application Ser. No. 774,376, filed Nov. 8, 1968 by J. E. Edington and M. L. Warnock. The circuit described in the Edington et al. application requires a central office battery reversal to distinguish between an initial deposit period and a subsequent deposit period. If, for example, a standard coin telephone trunk circuit applied negative battery to the ring and ground to the tip, it would be necessary to reverse the polarity of the voltage between tip and ring during a subsequent deposit period. There are two ways of accomplishing this reversal, one is by applying negative battery to the tip and ground to the ring, while the other involves applying positive battery to the ring and leaving the tip grounded.

Economic advantages would be attained in the coin telephone trunk circuitry by applying negative battery to the tip and ground to the ring. This cannot be done, however, with existing coin telephone circuits. If a coin is in the hopper when a call is terminated by placing the receiver on hook, a standing ground is applied to the tip. A negative battery applied by the coin telephone trunk to the tip would provide sufficient current to prevent the central office from recognizing that the coin telephone set had been placed on the on-hook condition. Therefore, to accomplish limited coin-free calls from coin telephones, coin telephone trunks are presently being equipped with two talking batteries to facilitate battery reversal while still enabling the trunk to recognize a return to on-hook condition.

BRIEF DESCRIPTION OF THE INVENTION

In accordance with this invention, a coin telephone circuit having a pair of leads extending to a central office has an initial deposit indicating circuit which is selectively connected to a first of the leads in response to a control signal applied to the second of the leads. The control signal has a predetermined minimum amplitude so that the initial deposit indicating circuit is not connected to the first lead during normal operation of the telephone circuit. In this way, the initial deposit indicating circuit is isolated from the telephone circuit allowing battery reversal without the need of a second talking battery in each coin telephone trunk.

In one mode of operation, an initial deposit test signal is applied to the first lead before actuation of the second lead and again after actuation of the second lead to ensure that a response to the initial deposit test is not fraudulent.

DESCRIPTION OF THE DRAWING

The sole FIGURE shows partially in block diagram and partially in schematic form a coin telephone circuit built in accordance with the teaching of this invention.

DETAILED DESCRIPTION

Referring now to the sole FIGURE, we see a coin telephone circuit similar to the coin telephone circuit disclosed in the above-mentioned Edington et al. patent application and including the improvements of this invention. The telephone circuit may be looked upon as functionally including four interconnected parts, a speech network 10, an initial deposit circuit 11, circuitry 12 associated with a totalizer mechanism (not shown) and an initial deposit energization circuit 13.

A totalizer such as one which would be associated with the circuitry 12 is a device which registers the deposit of coins by rotating a shaft from an initial position through an angle indicative of the value of the coin deposited. In effect the totalizer shaft stores coin deposit information as it rotates. The shaft carries a set of cams therewith. One of the cams actuates contact 14A when the shaft is rotated from its initial position. A second pair of contacts 16A and 16B are operated when the totalizer is rotated through an angle indicative of the deposit of a coin or coins having a total value equal to some preselected initial rate.

The information stored by the angular rotation of the shaft can be retrieved by rotating the shaft in a reverse direction to reset it to its initial position. The resetting function is performed by a stepping motor 15 which is arranged to drive a ratchet wheel mounted on the totalizer shaft through preselected angular steps indicative of a preselected coin value. The stepping motor 15 has a pair of contacts 15A and 15B associated therewith. When the stepping motor 15 brings the shaft to its initial position, the contact 14A is reset while the initial rate contacts 16A and 16B are not reset until a reset magnet 20 is energized. A totalizer mechanism as above described is disclosed in detail in U.S. Pat. No. 3,146,312, entitled "Coin Telephone Control Apparatus," which issued on Aug. 25, 1964 to E. R. Andregg et al.

The stepping motor 15 and the contacts 14A, 15A, 15B, 16A, and 16B are arranged in the present circuit in exactly the same manner as they are in the above-mentioned Edington et al. application. The stepping motor 15 and an oscillator 17 are selectively alternately connected across a diode bridge comprising diodes 18, 19, 21, and 22 by the contacts 15A and 15B. The contact 15B is normally closed so that the stepping motor 15 is normally connected across the bridge. Upon energization of the bridge, the stepping motor 15 operates one step opening contact 15B and closing contact 15A for a predetermined time interval. The closing of contact 15A connects oscillator 17 across the energized bridge providing a tone. After the predetermined interval when the contact 15A again opens and the contact 15B again closes, the stepping motor 15 is reconnected across the bridge and the oscillator 17 is removed therefrom. If the bridge is still energized, the stepping motor 15 operates again.

The bridge circuit is connected between a ring terminal R and normally open switch hook contact 23A in a conduction path comprising ring terminal R, the bridge circuit, normally open switch hook contact 23A, speech network 10, normally closed contact 24A of a relay 24, and tip contact T. Two paths shunt the bridge circuit. One includes a diode 26, normally closed, initial rate contact 16A and normally opened switch hook contact 23B. The other path includes normally closed totalizer contact 14A.

The two shunt paths are included to allow the coin telephone circuit to operate in two modes. In the first or initial deposit mode, the totalizer should not be reset until a predetermined amount of money has been deposited and the contacts 16A and 16B have been operated. In the second mode, it is desirable to reset the totalizer for each coin deposited energizing the oscillator 17 to provide a predetermined number of signal bursts for each coin. Therefore, during the initial deposit mode, negative battery is applied to the ring while ground is applied to the tip. When the telephone set goes off-hook closing normally open switch hook contacts 23A and 23B, current flows from tip to ring through contact 24A, speech network 10, now closed, switch hook contact 23A, and through both of the shunting paths. If, for example, the initial deposit rate were ten cents and a nickel were deposited, contact 14A would be opened. If it were not for the second shunting path, the stepping motor 15 would then reset the totalizer so that the initial deposit contacts 16A and 16B could be operated if a second nickel were deposited at a later time. However, with the negative battery on the ring and ground on the tip, the properly poled diode 26 together with the normally closed initial rate contact 16A and the now closed switch hook contact 23B, current is still maintained shunting the diode bridge.

The deposit of a second nickel operates the initial deposit contacts 16A and 16B. The operation of normally closed contact 16A opens up the second shunt path around the bridge applying voltage across the stepping motor 15. The stepping motor 15 transfers contacts 15A and 15B disconnecting the stepping motor 15B from the bridge and connecting the oscillator 17 thereacross twice, at which time the contact 14A is reset again shorting the bridge. During the resetting operation, two bursts of tone were supplied by the oscillator 17 which in this mode are incidental and do not necessarily operate any other equipment.

In accordance with this invention, a test for initial deposit is made from the central office by applying a voltage to the ring terminal sufficient to break down a gas tube 25 in series with the coil of relay 24 and ground. For example, a voltage of minus 130 volts might be applied to the ring conductor. When the gas tube 25 breaks down, the relay 24 operates opening normally closed contact 24A and closing normally opened contacts 24B and 24C. The closing of contact 24C shunts the gas tube 25 with a pair of back-to-back zener diodes 27 and 28. The breakdown voltage of the zener diodes 27 and 28 is less than the sustaining voltage of the gas tube 25 thereby extinguishing the gas tube 25 while holding the relay 24 operative. This extends the life of the gas tube 25.

The opening of contact 24A breaks the DC path between the tip and ring terminals while the closing of contact 24B connects the initial deposit circuit 11 to the tip terminal. At this timer, negative battery typically minus 48 volts is applied to the tip. Current flows to the tip through closed contact 24B, reset magnet 20, initial rate contact 16B, a coil circuit of a coin collect or return mechanism 29 and a hopper trigger contact 31, which is closed when a coin is present in the coin hopper. The flow of current through this path activates a relay in the central office indicating an initial deposit.

This arrangement is particularly adaptable to a system for detecting attempts at fraudulently obtaining coin telephone service. Minus 48 volts can be applied to the tip terminal before and after energization of the ring terminal. Normally opened contact 24B holds the initial deposit circuit 11 isolated from the tip terminal, until the ring terminal is energized, therefore no current should be detected blowing to the tip before the application of the minus 130 volts to the ring and current should be detected thereafter. A standing ground applied to the tip conductor by means other than the deposit of a coin would than be detected as a fraudulent ground by the central office circuitry.

Since the initial deposit energization circuit 13 is nonpolar, either positive or negative voltage can be applied to operate the relay 24. In this case minus 130 volts was employed because minus 48 volts was applied to the tip. In this way the voltage between tip and ring is kept to a minimum.

After an initial deposit test is satisfactorily completed, the talking battery in the central office is reversed applying ground to the ring terminal and minus 48 volts to the tip terminal. After a predetermined interval typically 30 seconds before the end of the time covered by the initial deposit, minus 130 volts is applied to both the tip and ring terminals. The application of minus 130 volts to the ring terminal again energizes relay 24 opening up contact 24A and closing contact 24B. The minus 130 volts applied to the tip terminal passes current through contact 24B, reset magnet 20, contact 16B, the coin collect or return circuitry 29 and the hopper trigger contact 31. As is disclosed in the above-mentioned Edington et al. application, the reset electromagnet 20 reopens contact 16B before the coin collect or return circuitry 29 can operate. Therefore, an SCR circuit 32 parallels contact 16B which breaks down to provide a low impedance to the 130 volts, but will not break down with the 48 volts applied during the initial deposit test. The current sustained through SCR circuit 32 collects the coin opening up the hopper trigger contact 31. To return a coin, positive 130 volts is applied to tip and ring to operate the collect or return circuitry 29 in a reversed direction.

After the coin is collected, ground is again applied to the ring terminal and minus 48 to the tip. If the call is terminated by placing the receiver on-hook during an interval when ground is present on the ring terminal and minus 48 on the tip terminal, switch hook contacts 23A and 23B open. Current ceases to flow to the tip and ring terminals indicating to the central office equipment that the call has been terminated. In prior arrangements without the relay 24 and its associated contacts this would not be possible. The ground provided by the initial deposit circuitry 11 would maintain current to the tip terminal if a coin were present in the hopper at the time of call termination.

Two more features of the circuit relating to overtime deposits which are similar to the circuit shown in the Edington et al. application shall be briefly discussed to give a complete understanding of the circuit of this invention. An automatic test for nickel overtime can be made by applying plus 130 to the ring circuit operating the relay 24 and its associated contacts and positive 48 volts to the tip terminal. If a nickel had been deposited, current will flow through the hopper trigger contact 31, the collect or return circuitry 29, diode 33, the reset magnet 20 and contact 24B. The inclusion of diode 33 shunting initial rate contact 16B thereby allows ground to be tested through the hopper trigger contact 31 for a nickel deposit.

When an operator intercedes to supervise collection of overtime deposits, the ring terminal is grounded and minus 48 is applied to the tip terminal. When overtime deposits are made, totalizer contact 14A operates opening the shunt path around the stepping motor 15 and oscillator 17. Since diode 26 is reversed biased, this path no longer shunts the stepping motor 15 and oscillator 17, therefore, all coin deposits provide an appropriate number of oscillator bursts for the operator to record.

It should be understood that various other embodiments and modifications can be made by those skilled in the art without departing from the spirit and scope of the invention.

What is claimed is:

1. A pay station telephone transmitting and receiving circuit having first and second terminals connected together through a first normally conducting path;

a second conduction path connecting between said second terminal and a point of reference potential, including means for providing a second control signal in response to a first control signal of predetermined minimum amplitude coupled to said second terminal;

said means for providing said second control signal including a relay having a coil, a first normally opened contact and a normally closed contact, said normally closed contact being serially connected in said first conducting path, and said coil being serially connected in said second conduction path;

an initial deposit circuit connected to said first terminal through said first normally opened contact, said initial deposit circuit including coin hopper trigger circuitry for detecting a coin and providing a condition signal in response thereto;

said relay operating in response to said second control signal, breaking said first conducting path and connecting said initial deposit circuit to said first terminal.

2. The telephone transmitting and receiving circuit in accordance with claim 1 in which a bridge circuit comprised of diodes is connected in said first conducting path; and a third conduction path including a serially connected diode is provided for shunting said bridge circuit.

3. The telephone transmitting and receiving circuit in accordance with claim 2 also including:

an oscillator connected to said bridge to provide a tone when said bridge is energized.

4. The telephone transmitting and receiving circuit in accordance with claim 1 in which:

said means for providing a second control signal includes a gas tube serially connected with the coil of said relay in said second conduction path.

5. The telephone transmitting and receiving circuit in accordance with claim 4 in which said relay also includes a second normally opened contact; said telephone circuit also including:

a pair of back-to-back zener diodes connected in series with said second normally opened contact to form a series circuit; and means for connecting said series circuit in parallel with said gas tube.

6. The telephone transmitting and receiving circuit in accordance with claim 5 in which said initial deposit circuit further includes coin collect or return circuitry connected in a fourth conduction path;

said coin collect or return circuitry operating in response to a third control signal coupled to said first terminal for collecting a coin detected by said trigger circuitry, said third control signal having a predetermined minimum amplitude and having a predetermined polarity with respect to said point of reference potential; and said coin collect or return circuitry operating in response to a fourth control signal coupled to said first terminal for returning a coin detected by said trigger circuitry, said fourth control signal having a predetermined minimum amplitude and having a polarity opposite to said predetermined polarity of said third control signal with respect to said point of reference potential.

7. In a telephone pay station, a transmitting and receiving circuit having first and second terminals connected together through a predetermined conduction path comprising a station loop, a money receptacle in said station, an initial deposit circuit for supplying to an output terminal thereof a reference potential in response to the deposit of a coin in said receptacle, an initial deposit energizing circuit connected to said second terminal to be activated in response to a predetermined potential with respect to said reference on said second terminal, and means responsive to activation of said energizing circuit for simultaneously opening said conduction path and connecting said output terminal to said first terminal.

* * * * *